UNITED STATES PATENT OFFICE.

WILLIAM H. ALLEN, OF DETROIT, MICHIGAN.

CEMENT.

1,261,750.　　Specification of Letters Patent.　　Patented Apr. 9, 1918.

No Drawing.　　Application filed December 12, 1917. Serial No. 206,836.

*To all whom it may concern:*

Be it known that I, WILLIAM H. ALLEN, a citizen of the United States, and residing at Detroit, in the county of Wayne and State of Michigan, have invented a new and Improved Cement, of which the following is a specification.

This invention relates to plastic self-hardening cements consisting of admixtures of insoluble oxids and acid compounds of phosphorus, such as liquid acids or acid salts, which cements will remain soft for a limited length of time after being prepared so that they may be suitably applied, and then harden or set by reason of chemical and perhaps physical action between the substances composing the cements, and its object is to provide a cement of this character which shall be insoluble in cold or hot water or steam, which will not be affected by the atmosphere, which will become very hard after it has set, and which will form a chemical or physical union with the surfaces of articles of iron and steel when applied thereto.

My improved cement is formed of finely powdered iron oxid and phosphoric acid or any of the acid salts of phosphorous oxids, the acid compounds of phosphorus being diluted with water and the iron oxids mixed therewith to a pasty consistency.

The preferred iron oxid is natural magnetite, which needs no treatment except pulverizing. Iron scale formed by heating iron or steel should first be heated to oxidize all metallic iron therein. Hematite may be used, but the cement is less desirable than when $Fe_3O_4$ is employed.

I prefer a fifty per cent. solution of ortho-phosphoric acid, although the meta or glacial acid may be used. If soluble acid phosphates are used, the acid strength will be as near a fifty per cent. solution of acid as is possible.

This cement when set becomes very hard, and seems to actually unite with the surfaces of iron and steel to which it is applied, probably because the phosphoric acid causes not only the iron oxid but also the surface of the articles of iron or steel to change to basic ferro-ferric phosphates. When the cement is placed between two surfaces of steel, great force is required to separate them.

The cement may be used to fill cracks and holes in iron castings, especially where the cement is to be exposed to the action of hot water and steam. The cracks in cylinder heads of automobile engines caused by the freezing of the cooling water may be satisfactorily closed by this cement.

If the above mixture is diluted with water and then applied as a wash to metal surfaces, it will fill all interstices and protect such surfaces from the elements. It is particularly valuable in protecting surfaces of iron and steel from rusting. It will be understood that the iron oxid and the acid compounds of phosphorus will not be mixed until the material is to be used.

I claim:—

1. A cement composed of powdered iron oxid and a solution of an acid compound of phosphorus.

2. A cement composed of powdered $Fe_3O_4$, water and an acid compound of phosphorus.

3. A cement paste composed of powdered $Fe_3O_4$, water and phosphoric acid.

4. A cement composed of powdered $Fe_3O_4$ mixed with a sufficient amount of a fifty per cent. solution of phosphoric acid to make a paste.

WILLIAM H. ALLEN.